United States Patent

[11] 3,549,904

[72] Inventor Adolph Karl Rapp
Princeton, N.J.
[21] Appl. No. 750,883
[22] Filed Aug. 7, 1968
[45] Patented Dec. 22, 1970
[73] Assignee RCA Corporation
a corporation of Delaware

[54] NON-DESTRUCTIVE READ-OUT MEMORY CELL
7 Claims, 3 Drawing Figs.

[52] U.S. Cl. .......... 307/247, 307/238, 307/251, 307/279, 307/291
[51] Int. Cl. .......... H03k 3/286
[50] Field of Search .......... 307/247, 251, 238, 279, 291, 292

[56] References Cited
UNITED STATES PATENTS

| | | | |
|---|---|---|---|
| 3,292,008 | 12/1966 | Rapp | 307/247 |
| 3,305,728 | 2/1967 | Bailey | 307/247 |
| 3,403,266 | 9/1968 | Heuner et al. | 307/247 |
| 3,402,305 | 9/1968 | Gilligan | 307/292 |
| 3,445,684 | 5/1969 | Uimari et al. | 307/247X |

*Primary Examiner*—John S. Heyman
*Attorney*—H. Christoffersen

ABSTRACT: A circuit arrangement to write information into and to read information out of an active storage or memory cell comprising a transistor flip-flop. Write-in is done by means of two coincidence gates and two input data lines. Each coincidence gate is connected between a different one of the two input/output points of the flip-flop and a respective one of the two input data lines. Readout is achieved by means of also using one or both of the input lines as sense lines in conjunction with a sense mode coincidence gate. An input-sense line is coupled to the conduction path of the sense gate whose conductivity is controlled by the data stored in the flip-flop.

PATENTED DEC 22 1970

3,549,904

INVENTOR
A. KARL RAPP

BY H. Christoffersen
ATTORNEY

NON-DESTRUCTIVE READ-OUT MEMORY CELL

BACKGROUND OF THE INVENTION

The present invention relates to active memory cells, to a memory organization of such cells, and, in particular, to improved means for writing into and reading out of such cells. Memory cells employing four insulated gate field effect transistors used to practice the invention have been described in U.S. Pat. No. 3,191,061.

In a large memory system it is desirable to have fast write-in and readout times in order to shorten the cycle time. It is also desirable in a nondestructive readout memory system to have the cell well buffered from the sensing line in order to ensure the nondisturbance of the state of the memory cell.

It is an object of the present invention to provide fast write-in times by coupling two data input lines with overvoltage driving capability to the flip-flop by means of low impedance, high conduction paths.

It is another object of the invention to have the cell control the conductivity of the sense line conduction path, but not by being in series therewith. This renders the cell substantially immune to the perturbations caused by the sensing mode.

BRIEF SUMMARY OF THE INVENTION

In arrangements embodying the invention a transistor flip-flop cell is accessed by means of two low impedance, high conduction paths from two data input lines provided with overvoltage driving capability for quick write-in of the data to be stored. During readout the memory cell controls the conductivity of the input-sense line conduction path, but is not in series therewith. The cell is thus nondestructively readout, being buffered from the input-sense line by an extremely high impedance.

DETAILED DESCRIPTION

Figure 1:
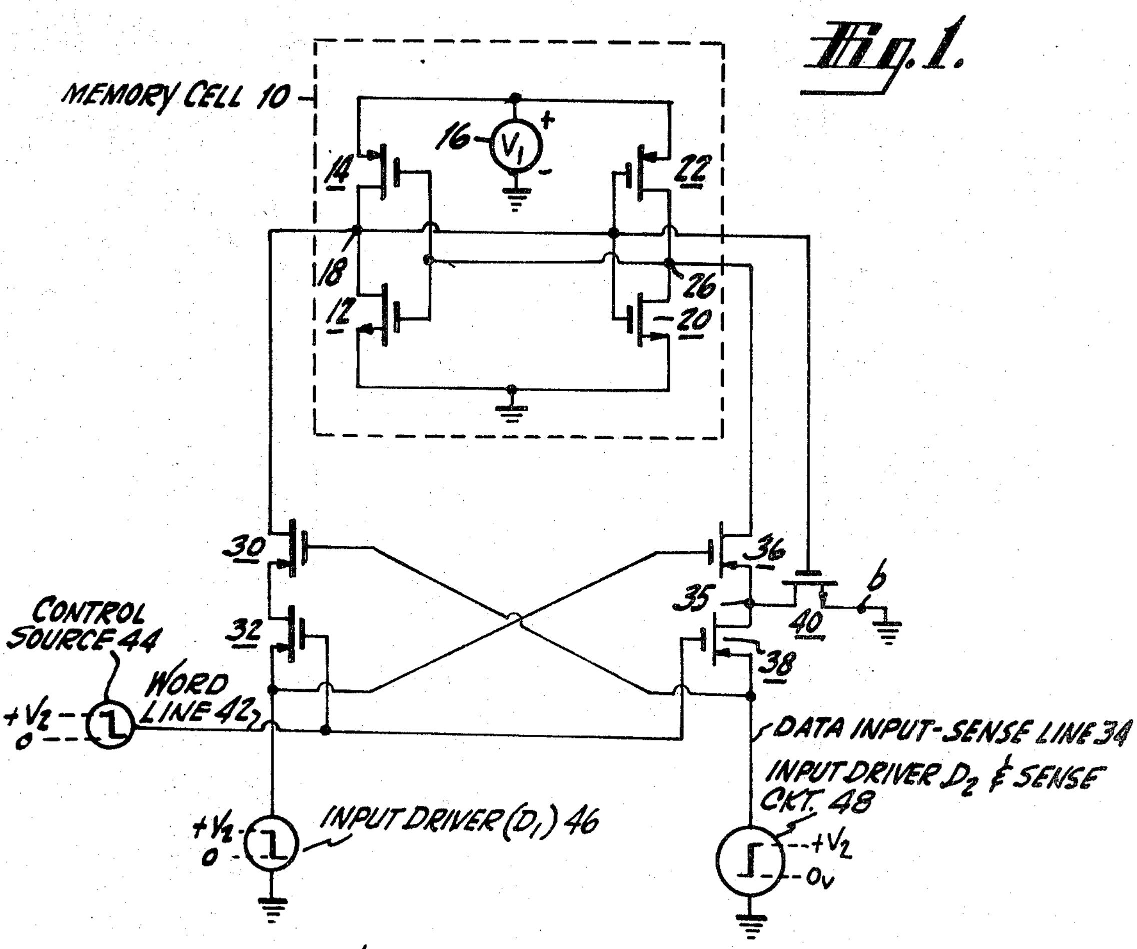
FIG. 1 is a schematic drawing of a memory cell and the associated write-in and readout circuitry embodying the invention.

The active devices which are preferred for use in practicing the invention are those of a class known in the art as insulated gate field effect transistors. For this reason, the circuits are illustrated in the drawings as employing such transistors, and will be so described hereinafter. However, this is not intended to preclude the use of other suitable devices and, to this end, the term "transistor," when used without limitation in the appended claims, is used in a generic sense.

An insulated gate field effect transistor may be defined generally as a majority carrier device that comprises a body of semiconductive material having a source and a drain in contact with the body and defining generally the ends of a conduction channel, or current carrying path, through the body. A gate (control electrode) overlies at least a portion of the conduction path and is separated therefrom by an insulator or region of insulating material. Since the gate is insulated from the body, it does not draw any current under steady state operating conditions, or at least it draws no appreciable current, whereby the gate of one transistor may be connected directly to either the source or drain of the other transistor with little or no steady state current flow through the connection.

A transistor of this type may be either a P-type conductivity unit or an N-type conductivity unit. A P-type unit is one in which the majority carriers are holes, and an N-type unit is one in which the majority carriers are electrons. Enhancement type units are preferred to depletion type units. By way of definition, a P-type enhancement unit has a relatively high conductivity conduction path when the gate voltage is negative relative to the source voltage, and has a very, very low conductivity when the gate and source voltages are equal, or the gate voltage is positive relative to the source voltage. Such a device is indicated in the drawings by the symbol appearing in FIG. 1 in which the source electrode is identified by an arrowhead pointing inwardly, and the drain may be identified as the other electrode on the same side of the device. As is known, insulated gate field effect transistors are bidirectional devices in which current can flow in either direction through the conduction channel.

An N-type enhancement unit, on the other hand, is one which has a relatively high conductivity channel when its gate voltage is positive relative to its source voltage, and which has a very, very low conductivity when the source and gate voltages are equal, or when the gate voltage is negative relative to the source voltage. Such a device is represented in the drawings to be described by the symbol given in FIG. 1 where the source is that electrode to which an arrowhead is affixed. In this case, however, the arrow points away from the body.

In the embodiment of the invention illustrated in FIG. 1, a four-transistor memory cell comprising two cross-coupled inverters is contained within the dashed box 10. The first inverter includes a first N-type transistor 12 and a first P-type transistor 14 having their conduction paths connected in series in a first circuit branch between a point of reference potential, illustrated as circuit ground, and the positive terminal of a source 16 of $V_1$ volts operating potential, which may be, for example, a battery. The drains of these transistors are connected by negligible impedance means to a junction 18 and to the gates of the second inverter which includes a second N-type transistor 20 and a second P-type transistor 22. Transistors 20 and 22 have their conduction paths connected in series with each other in a second circuit branch which is in parallel with the first circuit branch. The drains of transistors 20 and 22 are connected by negligible impedance means to a junction 26 and to the gates of the transistors in the first circuit branch.

The flip-flop just described in bistable and, in either steady state, draws no appreciable current, whereby the steady state power dissipation is very, very low. In particular, when the transistors 12 and 14 have $+V_1$ volts applied at their gates, transistor 12 is biased on and transistor 14 is biased off. The voltage at junction 18 then is ground potential and little current flows through the conduction path of transistor 14. The ground potential is applied at the gates of the other transistors 20 and 22, biasing transistor 20 in the nonconducting condition and biasing transistor 22 on. The voltage at junction 26 then is approximately $+V_1$ volts, which voltage maintains the transistors 12 and 14 in the state indicated above. The memory cell may be considered as storing a binary "O" bit under these conditions.

In the other stable state, transistors 12 and 22 are biased off and transistors 14 and 20 are biased in the on condition. The voltage at junction 18 then is $+V_1$ volts, and the voltage at junction 26 is at ground potential. The memory cell may be considered as storing a binary "1" bit of data under these conditions.

Junctions 18 and 26 serve as input/output terminals for the memory cell 10. Junction 18 is coupled to data input line 28 ($D_1$) by way of the coincidence gate comprising P-type transistors 30 and 32, and junction 26 is coupled to data input line 34 ($D_2$) by way of the coincidence gate comprising P-type transistors 36 and 38. The drain of transistor 30 is connected to junction 18 and its source is connected to the drain of transistor 32, whose source is connected to data input line 28. Line 28, in turn, is connected to data input source 46. The drain of transistor 36 is connected to junction 26 and its source is connected to common point 35 to which the drains of transistors 40 and 38 are also connected. The source of transistor 38 is connected to data input line 34 which is connected to data input source and sense circuit 48. Input source 46 and input source 48 apply either one of two voltage levels to their respective lines. The first level is substantially equal to a voltage $V_2$ and the second level is substantially equal to ground or reference potential.

Control of the coincidence gates is achieved by connecting the gate of transistor 30 to data input line 34, the gate of transistor 36 to data input line 28, and the gates of transistors 32 and 38 to word line 42, which is driven from a source 44 of control signals.

The data-sensing means is completed by connecting the source of transistor 40 to a point of reference potential indicated as circuit ground and by connecting its gate to junction 18. As shown, the data means includes a conduction path and two control elements. The conduction path includes the series combination of transistors 38 and 40, line 34 and the driver and sense circuit 48. The two control elements are the gates of transistors 38 and 40.

The word line 42 is common to all of the memory cells for a word of information, e.g., the memory cells in a row of the memory, and the data input lines ($D_1$ and $D_2$) are common to all of the cells of like bit significance in the several words, e.g., to all of the cells in a column of the memory. Such a memory arrangement is illustrated in block form in FIG. 2.

Figure 2:
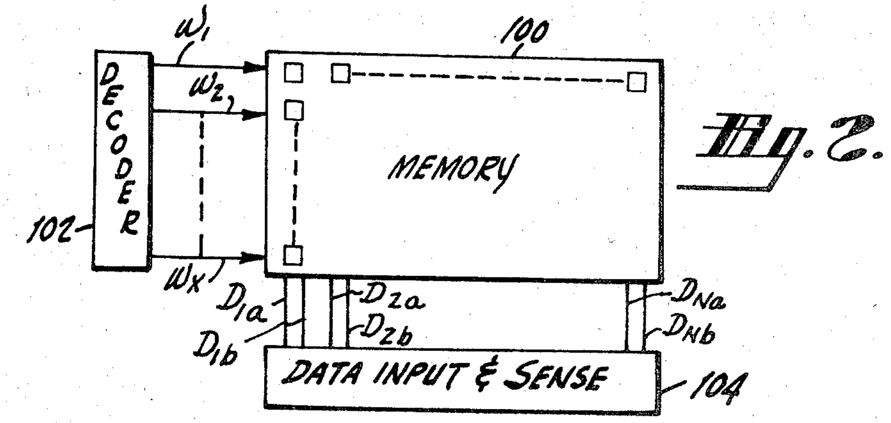
FIG. 2 is a block diagram of a word-organized memory system employing the invention.

As illustrated in FIG. 2, the memory cells with their associated write-in/readout gates are arranged in rows and columns of the memory 100. The cells of each row may be considered to be storing the bits for one word of information, and all of the cells in the same column of the memory store the bits of like significance in the several words. Each row of cells has a different word line $W_1 \ldots W_x$ associated therewith, which word lines are enabled selectively one at a time by a decoder 102. The control source 44 of FIG. 1 then may represent one output stage of the decoder and the word line 42 may be one of the word lines $W_1 \ldots W_x$ of FIG. 2. Each column of memory cells has associated therewith two data lines, which data lines are connected to a data input and sense unit 104. The lines 28 and 34 of FIG. 1 then are one of the pairs of data lines, e.g., $D_{1a}$, $D_{1b}$ of FIG. 2 and the input drivers 46 and 48 are different units in the data input and sense block 104.

Consider now the operation of the circuit of FIG. 1. Note first that the source of potential 16 applied to the flip-flop has a value $V_1$, while the data input sources 46 and 48 and word select control source 44 have either a first value of approximately zero volts or a second value of $V_2$ volts wherein $V_2$ preferably is a more positive potential than $V_1$. Note also that the word select control source 44 signal is at ground potential for either a write-in or readout operation. Analysis of the circuit shows that there are three coincidence gates. Each gate has two control elements (gates) and a conduction path defined by connecting the drain-to-source of two transistors in series. One write-in gate includes transistors 30 and 32 and another includes transistors 36 and 38, while the readout gate includes transistors 38 and 40. Transistor 38 is thus shared by a write-in and a readout gate. Until and unless transistors 32 and 38 are enabled, nothing can be written-in or readout of the cell 10. Thus, since transistors 32 and 38 are P-type devices the cell cannot be accessed until the word line 42 signal, applied to the gates of transistors 32 and 38, is at ground potential. Turning these transistors on selects a particular cell for write-in or readout.

Once the memory cell is selected, the signals present on the data input lines, as set forth in Table I, determine whether a "1" or a "0" is written into the cell or whether the data in the cell is readout (sensed).

TABLE I

| | Word select | Input line, $D_1$ | Input line, $D_3$ | JCT 18 | JCT 26 |
|---|---|---|---|---|---|
| Write "1" | 0 | $V_2$ | 0 | $V_1$ | 0 |
| Write "0" | 0 | 0 | $V_2$ | 0 | $V_1$ |
| Sense | 0 | $V_2$ | $V_2$ | Unchanged | Unchanged |

Write "1" occurs if the input signal line 28 ($D_1$) is $+V_2$ and input signal line 34 ($D_2$) is at ground potential. When $D_2$ is zero volts, transistor 30 is biased on and there exists a very low impedance path between data source 46 and junction 18. A source 46 voltage of $+V_2$ volts is applied through transistors 30 and 32 to junction point 18 and drives that point positive, which also drives the gate voltages of transistors 20 and 22 positive, initiating the regenerative action causing junction 18 to go to $+V_1$, its binary "1" state. When the cell is initially in the "0" state, transistor 12 is biased on and junction 18 is connected to ground by the low drain-to-source impedance of transistor 12. The signal on $D_1$, which must be capable of driving the cell, is thus attenuated at junction 18 by the ratio of the "on" impedance of transistor 12 to the sum of the "on" impedances of transistors 30, 32 and 12. The design features of the circuit however ensure fast switching of the flip-flop even under this worst case condition. Firstly, as mentioned above, $V_2$ is greater than $V_1$. This enables the input data lines 28 and 34 to overdrive the cell by "jamming" the input voltage onto its input points. Secondly, all transistors in the gating circuitry as well as those of the flip-flop are operated in the saturated mode ensuring positive clamping of voltage levels. Thirdly, the saturated "on" impedance of the gating transistors may be designed to be lower than the saturated impedance of the transistors used in the flip-flop section of the circuit. Since impedance is a direct function of device area, the flip-flop transistors may be small area, high impedance devices, resulting in a net saving in chip space.

Write "0" occurs when $D_1$ is at ground potential and $D_2$ is at $+V_2$ volts. The zero volts applied to the gate of transistor 36 causes it to saturate resulting in a low impedance path between data source 48 and junction 26. As above, the combination of the high ($+V_2$) voltage applied by means of the low impedance path of transistors 36 and 38 ensures the driving of junction 26 to $V_1$ and the junction 18 to "0." As before, the flip-flop quickly switches to its new stable state and will remain in that state until a write "1" is applied to the circuit.

The Readout or Sense Mode occurs when the voltage on data input lines 28 and 34 is at $+V_2$ volts. $V_2$ volts applied to the gates of transistors 30 and 36 reverse biases those transistors and prevents any signal from being fed from either data input source 46 or 48 to the input/output points of the cell. Zero volts from control source 44 applied to the gate of transistor 38 biases it on, and if, in addition, junction 18 is at $+V_1$ volts, transistor 40 which is an N-type device is biased on and current can flow from sense circuit 48 through data input line 34, the conduction paths of transistor 38 and 40 and then to ground. The flow of current is indicative of the presence of a "1" in the cell. If the voltage at junction 18 is zero volts (the voltage at point 26 then being equal to $V_1$), transistor 40 will not conduct and no current will flow through the series conduction path including the sense circuit, thereby indicating the presence of a "0." Note that the sensing means just described leaves the gate undisturbed during readout since the gate-to-source impedance of transistor 40 is of the order of $10^{12}$ ohms. The memory cell thus controls the current flowing in the sensing circuit but is not in series therewith and is therefore rendered immune to any noise associated with the sense mode.

Transistor 40, as shown in FIG. 1, is an N-type device but a P-type device could be used instead with current flow indicating the presence of a "0" rather than a "1." Also, only one sensing circuit is shown in FIG. 1, but if data source 46 is designed with sensing means a transistor could be connected between the junction of the drain and source of transistors 32 and 30 and a point of reference potential, and its gate would be connected to either junction 18 or 26 depending on whether a "1" or "0" is to be sensed.

Figure 3:
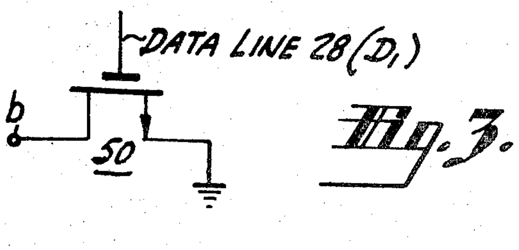
FIG. 3 is an additional control element to the memory cell embodying the invention.

The invention may be further refined by introducing a transistor 50 in series with transistor 40, as shown in FIG. 3. The drain of transistor 50 would be connected to the point marked *b* on FIG. 1 to which the source of transistor 40 would also be connected. The source of transistor 50 would then be connected to a point of reference potential and its gate would be connected to data input line 28 ($D_1$). Examination of FIG. 1 shows that transistor 40 shunts the data input signal which driver circuit 48 feeds to junction 26 to write "0" if a binary "1" is previously stored in the cell.

The addition of transistor 50 prevents any diversion of the data input signal current present in line 34 ($D_2$) by transistor 40 when the memory cell is storing a "1" data bit. By connecting transistor 50 in series with transistor 40 and the gate of transistor 50 to $D_1$, transistor 50 is backbiased when $D_2$ is used to write "0," preventing any substantial current flow through transistor 50. Alternatively, the need for transistor 50 may be eliminated by slightly increasing the threshold voltage of transistor 40 or by connecting the gate of transistor 40 to junction 26 by means of an RC network (where the capacitance could be the gate-to-source capacitance of transistor 40). Transistor 40 would then divert current from line 34 only when junction 26 would already be at $+V_1$ volts. When junction 26 is at $V_1$ volts (cell is in the "0" state) the loading of transistor 40 does not matter since there is no need for the cell to switch states. And, when junction 26 is at zero volts and the cell is to be switched, transistor 40 does not load the data input signal since it is cut off until the cell changes state.

The transistors for the Write-In gates have been shown as P-type devices, but it should be obvious to one skilled in the art that N-type devices may be used instead with the proper selection of the polarity of the input signals. It should also be obvious that the write-in/readout gates described herein may be used in combination with any transistor flip-flops, be they of the complementary or one-type construction, e.g. P-MOS. Even the two-transistor flip-flop, comprising two cross-coupled inverters wherein each inverter includes one transistor and a load resistor, may be used as a memory cell in conjunction with the circuit of the invention.

I claim:

1. The combination comprising:

a plurality of transistors each having an input means and an output means defining the ends of a conduction path through the transistor and having also a control means to control the conductivity of said conduction path;

a memory cell flip-flop including two cross-coupled inverters; each inverter having an input and an output; means connecting the input of one inverter in common with the output of the other inverter at a first point and the output of said one inverter in common with the input of the other inverter at a second point;

two input data lines, at least one of which is also a sense line;

first and second coincidence gates and first and second junction points;

the first coincidence gate comprising a first transistor having its conduction path connected between said first point and said first junction point and a second transistor having its conduction path connected between said first junction point and one of said two input data lines;

the second coincidence gate comprising a first transistor having its conduction path connected between said second point and said second junction point and a second transistor having its conduction path connected between said second junction point and the other one of said two input lines;

data sense means having at least one control means connected to one of said first and second points and a conduction path coupled at one end to that one of said first and second junction points which is coupled to an input data line which is also a sense line; and a control input point coupled to the control means of one transistor in each coincidence gate.

2. The combination as claimed in claim 1, wherein the control means of the other transistor in the second coincidence gate is connected to said one of said two input data lines and wherein the control means of the other transistor in the first coincidence gate is connected to said other one of said two input data lines; and wherein said data sense means includes a transistor, one of whose input and output means is coupled to a point of reference potential, the other one of said input and output means being connected to one of said first and second junction points.

3. The combination as claimed in claim 2, wherein the impedance of the conduction path of the transistors of the memory cell is higher than the impedance of the conduction paths of each of the other transistors for the same value of forward bias.

4. The combination as claimed in claim 2, wherein all the transistors are insulated gate field effect transistors; and wherein said input means, output means, and control means are the source and drain and gate, respectively.

5. The combination as claimed in claim 4, wherein the transistors of said first and second coincidence gates are of one conductivity; and wherein two of the transistors of said memory cell are of the opposite conductivity type.

6. The combination as claimed in claim 2, further including a first source of potential connected across said memory cell, and further including means for applying signals to said data input lines and to said control input point wherein the amplitude of the signals have either a first value which is greater in amplitude than the amplitude of said first source of potential or a second value substantially equal to reference potential.

7. The combination as claimed in claim 6, wherein the signals applied to the control input point switch the transistors coupled thereto from the "off" to the "on" condition during both the sensing operation and the write-in operation of said cell.